United States Patent

Minero, deceased et al.

[15] 3,660,646

[45] May 2, 1972

[54] CHECKING BY PSEUDODUPLICATION

[72] Inventors: Richard H. Minero, deceased, late of Raleigh, N.C. by John Q. Beard, administrator; Anthony J. Anello; Robert G. Furey; Lubos R. Palounek, all of Raleigh, N.C.

[73] Assignee: International Business Machines Corporation, Armonk, N.Y.

[22] Filed: Sept. 22, 1970

[21] Appl. No.: 74,340

[52] U.S. Cl. ....................235/153

[51] Int. Cl. ....................G06f 11/00

[58] Field of Search ....................235/153; 340/146.1, 172.5

[56] References Cited

UNITED STATES PATENTS 2,861,744 11/1958 Schmitt et al. ....................235/153 X
2,789,759 4/1957 Tootill et al. ....................235/153 X
3,040,984 6/1962 Cox et al. ....................235/153
3,047,227 7/1962 Thomas et al. ....................235/153
3,058,656 10/1962 Pomerene ....................235/153
3,252,149 5/1966 Weida et al. ....................340/172.5
3,471,686 10/1969 Connell ....................235/153

*Primary Examiner*—Charles E. Atkinson
*Attorney*—Hanifin and Jancin

[57] ABSTRACT

An error detection system is described which detects errors by performing a given arithmetic or logical operation using one data path followed by the performing of the same arithmetic or logic operation using a different data path. The results of the two arithmetic or logical operations are then compared, the failure of the two results to be identical indicating failure of a component used in the performance of the arithmetic or logical operation.

6 Claims, 4 Drawing Figures

INVENTORS
ANTHONY J. ANELLO
ROBERT G. FUREY
RICHARD H. MINERO, DECEASED
BY JOHN Q. BEARD,
ADMINISTRATOR
LUBOS R. PALOUNEK

BY John D. Crane
AGENT

CHECKING BY PSEUDODUPLICATION

BACKGROUND OF THE INVENTION

This invention relates to the detection of errors within computer systems and particularly errors occurring in arithmetic and logical operations performed by computing apparatus in the computer.

Due to the relatively complicated nature of digital computing equipment as well as other electronic apparatus which perform the computational functions, it is desirable to be able to detect when there is an equipment failure which would affect the validity of computational data. As a result, many techniques have been developed for determining the presence of calculational errors upon the resulting data from various arithmetic and logical operations performed by various forms of computational apparatus.

A technique very often employed is the use of parity. This technique utilizes an extra data bit which is associated with more than one data bit in a character or byte to represent whether the character or byte has an even or an odd number of binary one's in all the bit positions of the character or byte. The numerous techniques of using parity are well known in the prior art and further description is not necessary. Parity techniques, however, do suffer from one common problem, the ability of being able to detect only an odd number of errors. If any even number of data bits should prove to be in error, the use of simple parity over a character or byte is insufficient to detect this type of error.

Many other error detecting techniques have also been described in the prior art. A more powerful approach than the parity techniques is to utilize the characteristics of residue arithmetic. By utilizing predicted and actual residues for a given arithmetic or logical operation, the fact that the residues have a different magnitude is indicative of the presence of an error in the arithmetic or logical operation. By selecting the modulus, it is possible to obtain error detecting capability which exceeds the detecting capability of simple parity techniques. An inherent drawback, however, to residue techniques is that the amount of electronic circuitry required to implement such techniques is often too extensive to be economically feasible, especially for small computers or terminal applications.

Still another approach to error detection is the use of duplicate electonic circuitry wherein each of two sets of electronic circuitry is used to perform a given arithmetic or logical operation. The separate and independently developed answers are then compared to determine the presence of an error.

An obvious drawback to this technique is the requirement for doubling the hardware required to perform the operation in order to achieve the desired error detection capabilities.

In light of the aforementioned problems relating to the various techniques for error detection, it is a primary object of this invention to produce a system for failure detection in arithmetic and logical units which is both simple to implement as well as being relatively inexpensive.

It is another object of this invention to provide an error detection system for use in computers and other computational devices which is capable of detecting errors undetectable by parity techniques.

It is still another object of this invention to provide an error detection system which is less expensive to implement than either the well-known residue techniques or the hardware duplication technique.

In accordance with the objects of the present invention, the error detection approach of the present invention employs a technique which shall be called pseudoduplication. By pseudoduplication it is meant that errors are detected in a manner somewhat similar to the duplication of hardware technique. The pseudoduplication approach develops an electronic representation of an answer for a given arithmetic or logical operation and stores the representation in a register. The arithmetic or logical operation is performed a second time although the performing of the second operation requires the use of a different data path through the arithmetic and logic unit for each of the input data bits. If the electronic circuitry is working properly, the results of the first operation and that of the second operation using different data paths will be identical. A simple EXCLUSIVE OR circuit for each bit position is all that is required to detect the presence of an error as indicated by a difference between the first generated answer and the second generated answer for the given arithmetic or logical operation.

The above identified objects, features and advantages of the present invention will become more apparent in light of the following detailed description of a preferred embodiment thereof, as illustrated in the accompanying drawings.

IN THE DRAWINGS

DETAILED DESCRIPTION

Figure 1:
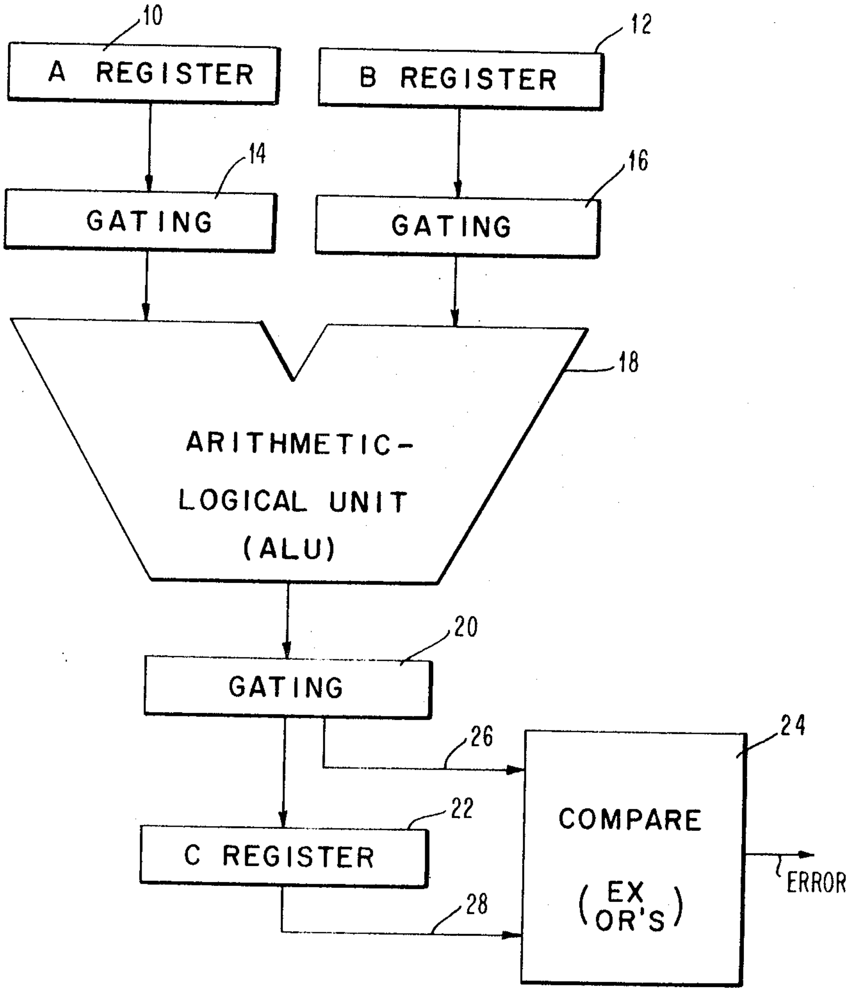
FIG. 1 is a simplified system diagram characterizing the error detection system of the present invention.

Referring now to FIG. 1, a system diagram is shown which characterizes the present invention in its broad sense. An A Register 10 and B Register 12 are provided for storing the data upon which a given arithmetic or logical operation is to be performed. The data typically would be represented in binary bit form and each of the data registers would contain a plurality of binary bit positions.

ALU 18 is an arithmetic-logical unit which is capable of performing various types of arithmetic and logical operations upon the data entering the ALU. The typical operations include addition, subtraction, AND, OR, and EXCLUSIVE OR. When proper gating signals are present, the data in A Register 10 will pass through gating circuitry 14 and enter ALU 18. Assuming that the gating circuitry 14 is activated in such a way that the data from A Register 10 passes directly through gating circuitry 14 to ALU 18, the data from A Register 10 can be considered to be lined up and will enter ALU 18 such that, for example, bit 1 of the data in A Register 10 will correspond to the input position of ALU 18 for bit 1. Gating circuitry 14, however, can be activated in such a way that the data in bit position 1 of A Register 10 can enter ALU 18 in the normal entry point for bit position 0. The specific nature of this gating will become more apparent from the below discussion relating to FIGS. 2 and 3. A similar relationship exists between the data in B Register 12 and its entry point into ALU 18 via gating circuitry 16.

The output of ALU 18 passes into gating circuitry 20 which is activated in such a way as to realign the data leaving ALU 18 so as to fall on the proper data bit boundaries. The realignment occurs at times when gating circuitry 14 and 16 were previously activated. The data passing through gating circuitry 20 can pass either to compare circuit 24 of C Register 22.

A simple example of the operation of the present invention would be to consider the performing of an OR operation upon the data contained in A Register 10 and the data in B Register 12. In the first phase or mode of the operation, the data in A Register 10 is gated directly to ALU 18 as is the data in B Register 12. The data enters the ALU 18 where the OR operation is performed. The output of ALU 18 represents the data that should result from an OR operation upon the given binary data contained within A Register 10 and B Register 12. This data leaving ALU 18 is gated through gating circuitry 20 to C Register 22. In order to determine whether the contents of the C Register 22 represent a correct result, a second OR operation is performed. The second phase of the operation takes the data in A Register 10 and gates the data via gating circuitry 14 so as to enter ALU 18 in data input positions which are different from those in the first phase of the operation. For example, data bit 1 of the data contained in A Register 10 might be gated by a gating circuitry 14 into data input bit position 0. A similar shifting also occurs for the other data bits of the data contained in A Register 10. The circuitry is also designed in such a way that gating circuitry 16 will respond to the data in B Register 12 so as to gate data bit 1 into the same entry for the data from B Register 12 as gating circuitry 12 performs for the data in A Register 10. For example, bit position 1 of B Register 12 would be gated via gating circuitry 16 into entry bit position 0 of ALU 18.

The ALU 18 is then activated to perform the OR operation upon the entering data. If the output of ALU 18 represents the results of the OR operation upon the data contained in A Register 10 and B Register 12 which has been shifted in accordance with gating circuitry 14 and 16 (during the second phase of the operation), the resulting answer should be shifted so as to be aligned upon the same data boundaries as the operation in the first phase. Thus, gating circuitry 20 is employed to shift the output from ALU 18 into alignment with the data previously transferred to C Register 22. The output of the data for the second phase of the operation is transmitted through gating circuitry 20 to line 26. Line 26 forms one input to compare circuitry 24. Line 28 comes from C Register 22 which forms the second input of compare circuit 24. Compare circuit 24 then acts to compare on a bit by bit basis the data contained within C Register 22 and the data being outputted by ALU 18 and shifted by gating circuitry 20. When compare circuit 24 determines that the data bits contained in C Register 22 are different from those data bits being transmitted along lines 26, compare circuit 24 generates a signal which indicates that a calculational error has occurred because the two results do not compare identically.

The above description demonstrates what is meant by pseudoduplication. Specifically, the technique of pseudoduplication does not employ an absolute redundancy of circuitry in order to detect errors. In actuality, the technique of pseudoduplication utilizes many if not all of the circuits used in the first phase of the operation. For logical operations, there is no need to expand the data paths through the ALU as the shifting is sufficient to detect errors for logical operations. For arithmetic and shift operations, the ALU must have additional data paths because of the internal operation of the ALU causes carries to be generated internally which affect adjacent data paths.

Figure 2:
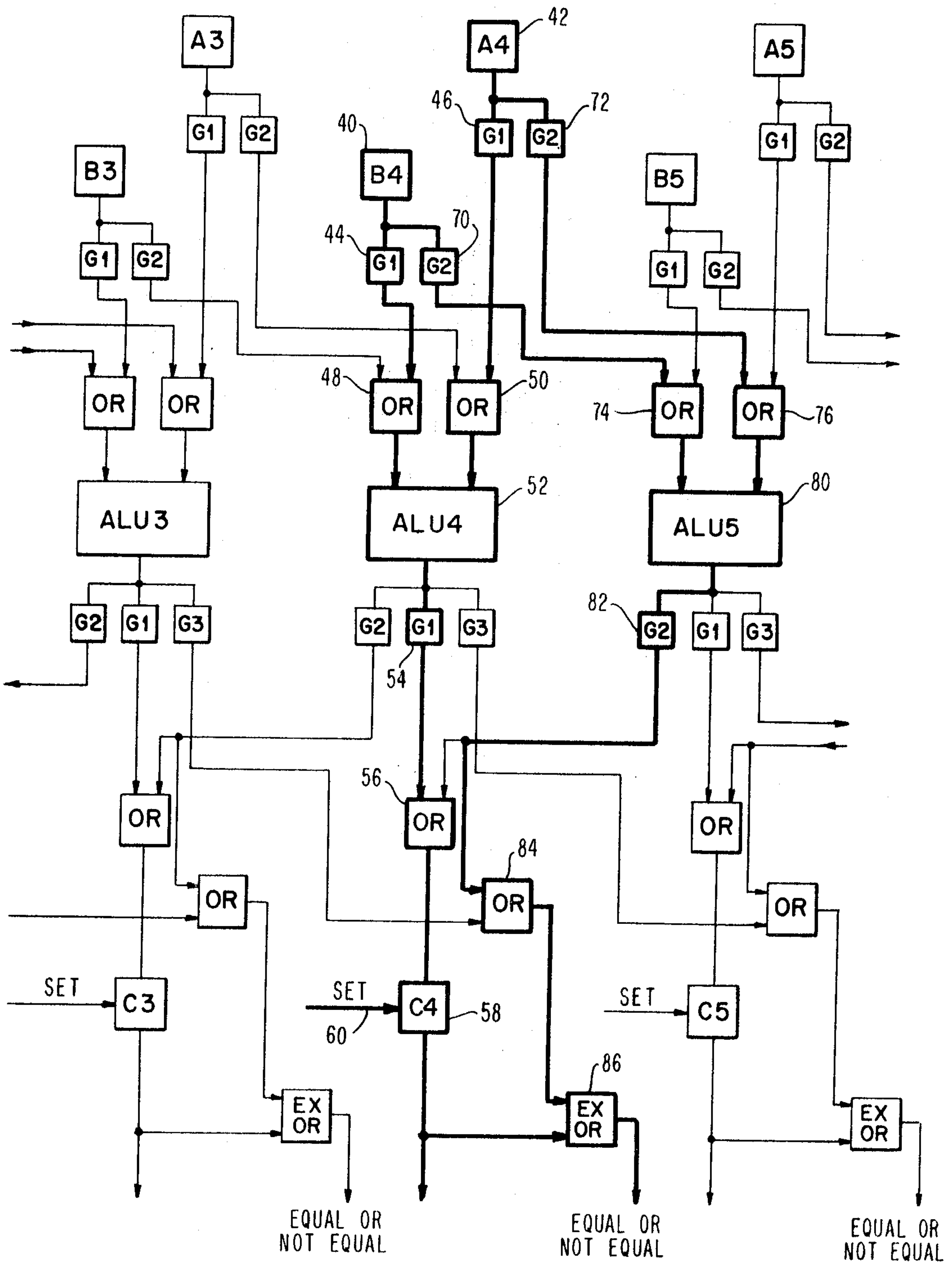
FIG. 2 shows a more detailed circuit configuration to exemplify the operations of the present invention in generating the answer for a given arithmetic or logical operation.

Referring now to FIG. 2, a more detailed description of the system shown in FIG. 1 is there shown.

For example, the A Register 10 of FIG. 1 has been replaced in FIG. 2 by registers representing the individual bit positions of the data contained within the A Register. Register A4 42 represents the fourth bit position of the binary data contained within A Register 10 of FIG. 1. Also shown is the fourth bit position of B Register 12 which is shown as Register B4 40. A similar register description is used for the other binary bit position of A Register and B Register. The output of each of the bit positions for the A Register and the B Register is connected to two gates labeled G1 and G2. All of the gating circuits shown in FIG. 2 which are labeled G1 are gated by a common clock line, not shown, such that the input to any G1 gate is transmitted to the output of that gate whenever the gating pulse is present. The presence of a gating signal at gate labeled G1 shall be noted as a first operating mode.

Referring specifically to FIG. 2, during the first operation mode or phase gates 44 and 46 are active in allowing the data contained in Register B4 40 and Register A4 42 to pass through gates 44 and 46 respectively to OR circuits 48 and 50. The data then passes directly from OR circuits 48 and 50 into ALU4 52. The two inputs to ALU4 comprise a set of paired inputs ALU4 52 is the portion of the logical unit 18 which acts upon data received from the fourth bit position in the data registers and outputs data to the fourth bit position of the output. ALU4 52 is capable of performing logical operations such as AND, OR, and EXCLUSIVE OR.

The logic unit ALU4 52 operates upon the data which appears at the input and passes the data on to the gating at the output of ALU4 52. Gate circuit 54 is activated at the same time as gate circuits 44 and 46 and allows the output of ALU4 52 to pass on to OR circuit 56. The OR circuit 56 output then forms an input to Register C4 58 which is the fourth binary bit position of Register C as shown in FIG. 1. A set signal 60 is applied to Register C4 58 so as to gate the data received from logic unit ALU4 52 into the C Register to make the data available for later comparison.

During the second phase of the operation, gates labeled G2 are activated while gates labeled G1 are not. Thus, during the second phase of operation different circuits in FIG. 2 should be referred to. During the second phase of the operation, gates 70 and 72 are active to transmit the data from Register B4 40 and Register A4 42 to OR circuits 74 and 76 respectively. The output of OR circuits 74 and 76 go directly to the input to logic unit ALU5 80. The output of the logic unit ALU5 80 is a function of the logical operation being performed as well as the data registers. The output data is passed through gate circuit 82 to the input of OR circuit 84. The output from OR circuit 84 is then placed at the input of EXCLUSIVE OR 86 while the output of Register C4 58 is placed to the second input to EXCLUSIVE OR 86. The output of EXCLUSIVE OR 86 indicates whether the content of Register C5 58 is identical to the output of logic unit ALU5 80. Such an equality would exist if logic unit ALU4 52 had performed during the first mode of operation in the identical way as did logic unit ALU5 80 in the second mode of operation. Assuming that the output of all the EXCLUSIVE OR elements indicates an equality between the content of C Register and the output of the different logic units used to perform the same operation upon the same data, it can be assumed that the content of the C Register represents the correct result for the logical combination of the data within the A Register and B Register which was performed by the various logic units.

The approach to pseudoduplication shown in FIG. 2 is essentially to use one data path to generate a first result for a given operation and use a second data path, different from the first data path, to develop a check that should be identical to the data resulting from the use of the first data path. It should be noted that for operations such as AND, OR and EXCLUSIVE OR, the only additional hardware required to generate the check data word is the additional required gating circuitry. No additional logic unit data paths must be created to check these operations. However, when it comes to operations such as addition and shifting, it does become necessary to add a few new data paths for checking purposes.

Figure 3:
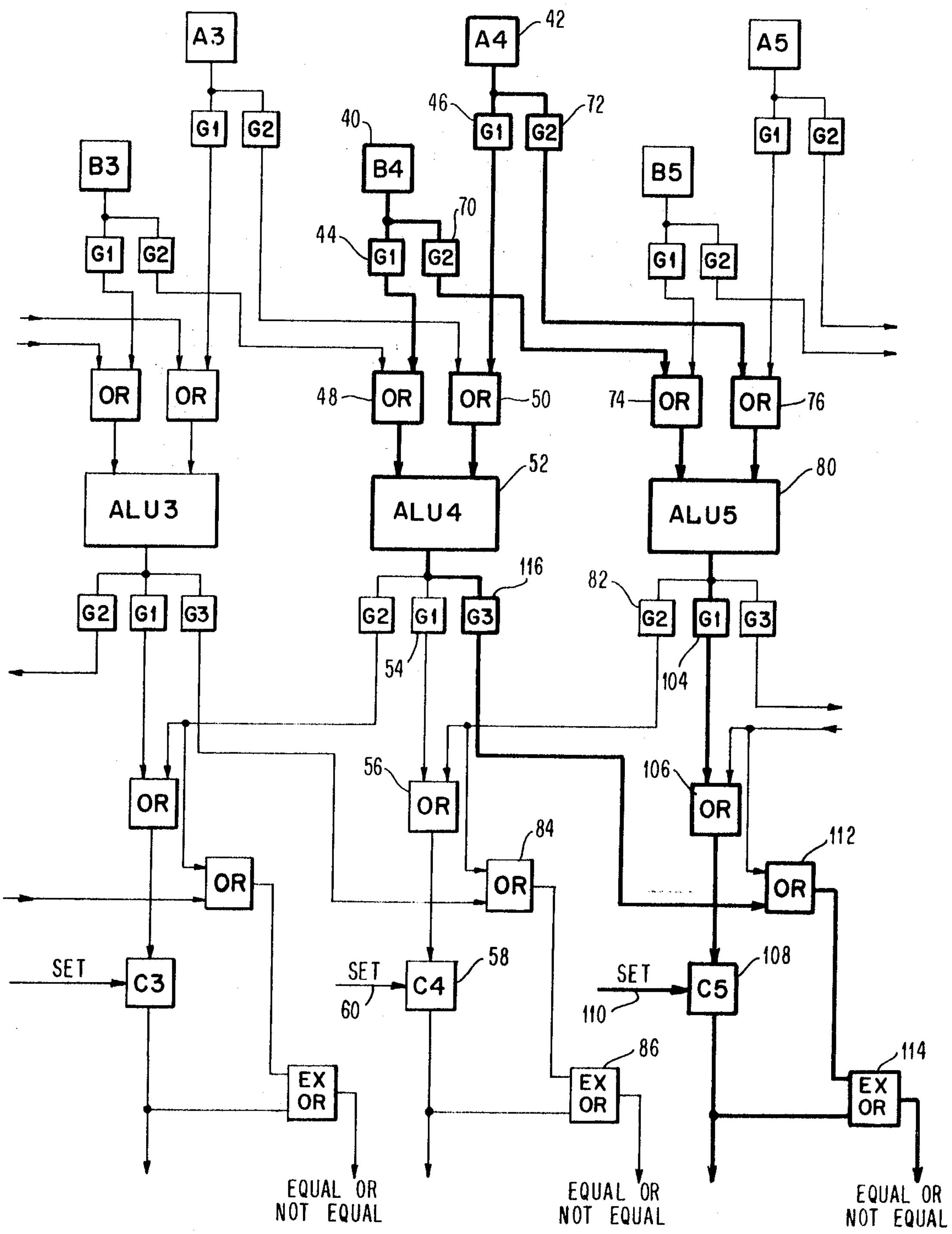
FIG. 3 shows the generation of the answer for the given arithmetic or logical operation using alternate data paths.

FIG. 3 shows a different approach to the operation of the present invention employing pseudoduplication. The data which formerly was gated through logic unit ALU4 during the first phase of operation is now gated through logic unit ALU5 80 during the first phase of operation. This shift in the data is caused by the gating of the gate circuit labeled G2 in FIG. 3 during the first phase of the operations of the circuits.

Specifically, gate element 70, 72 and 104 are active during the first phase of the operation. The data found in the fourth bit position of the data registers (A Register and B Register) are gated to the fifth input section of the logic unit i.e., to logic unit ALU5 80. The output of the logic unit ALU5 80 is gated via gating circuit 104 through OR circuit 106 to C Register position C5 108 and is set into the C register by a gating signal on line 110.

Referring again to FIG. 3, the second phase of the operation of the apparatus there shown operates by turning on the gate circuits labeled G1. Specifically, the data contained within data register B4 40 and A4 42 are gated via gate circuit 44 and 46 respectively to OR circuits 48 and 50. The output OR circuit 48 and 50 form a paired input to logic unit ALU4 52 which is conditioned to perform the same operation as was previously performed by logic unit ALU5. The output of logic unit ALU4 52 is gated via gate circuit 116 to OR circuit 112. OR circuit 112 then passes the data on to the input of EXCLUSIVE OR circuit 114. A second input to EXCLUSIVE OR circuit 114 is from the contents of the C Register for bit position 5 which is contained in C5 108.

The approach taken in FIG. 3 is essentially the same as that taken in FIG. 2 although different gating paths are employed to produce the same results. In each case, the logical operation performed during the first phase is identical to the logical operation performed during the second phase but the specific portion of the logic unit is different during the different phases of the operation. The net results of these two approaches are to improve on the error detecting techniques employing duplicate hardware and generating two separate answers for the operation which is to be checked because the gating circuits are the only added circuits required to produce the error check. It should be noted that another possible modification to the scheme shown in FIGS. 2 and 3 would be to shift the data from entry bit position 4 to entry bit position 3 during the first phase while allowing the data to pass through the logic unit to the fourth bit position during the second phase. There are, in addition, many possible modifications which could be made to the gating of the output from the various logical units which would be in the scope and intent of the present invention.

Figure 4:
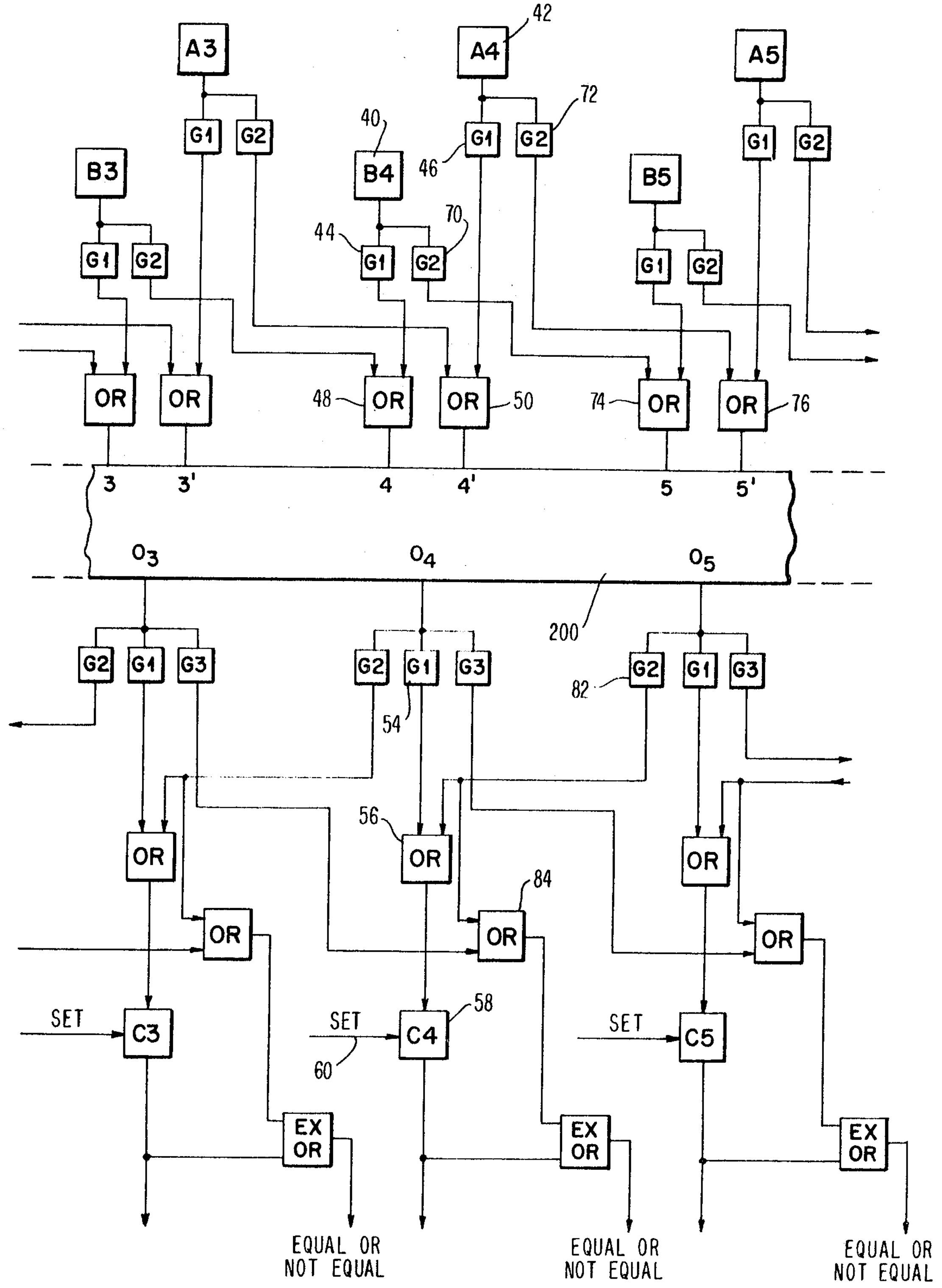
FIG. 4 shows the required configuration of the present invention for shift and arithmetic operations.

Referring now to FIG. 4, a system diagram similar to that shown in FIG. 2 is presented. The principal modification between FIG. 4 and FIG. 2 is that there is a different ALU 200 shown in FIG. 4 as compared to the logic unit of FIG. 2. ALU 200 represents an arithmetic and logical unit which specifically has the capability of performing arithmetic and shifting operations. In adders which are found in digital computers, it is necessary to have interconnections between the various bit positions because there is a requirement to propagate carriers from low order to higher order bit positions. For this reason, ALU 200 is shown to extend over a plurality of paired input positions.

In FIG. 4, ALU 200 is shown having a plurality of paired inputs 3, 3', 4, 4', and 5, 5'. Inputs 4 and 4', for example, represent the two input positions which normally receive data from the fourth data bit position in the data register, i.e., data register B4 40 and data register A4 42. In the case for an addition of the contents of the data in the A Register and the B Register, the binary bits from bit position 4 would pass through input 4 and input 4' and would be combined with carries from low order positions to generate an output at output 04. There are other outputs shown for bit position 3 and bit position 5 namely, output 03 and output 05.

For shifting operations, ALU 200 would accept data from one of the data registers and cause the data to be shifted either to the right or to the left. For example, the data appearing in the B Register might be shifted right by one bit position. The data bit appearing in data register B4 would enter through input 4 and be shifted right by one bit position so as to exit through output 05.

The system shown in FIG. 4 employs pseudoduplication techniques to detect errors in a operation of ALU 200 for both arithmetic and shifting operation. In the first mode of operation, the data would pass directly from the A Register and B Register to the associated input points. For example, the data in data register position A4 42 would be transmitted by gating circuitry 46 to OR circuitry 50 to input 4'. The data in Register B4 40 would be gated by a gate circuit 44 through OR circuitry 48 to input 4. The output of the respective positions of ALU 200 would then be transmitted through the gating circuitry to the C Register. For example, output 04 will be transmitted through gating circuit 54 to OR circuit 56. The data would then pass on to C Register position C4 58 and would be gated into the C Register by set signal 60.

In the second mode of operation, the data in the A Register position A4 42 would be transmitted by a gate 72 and OR circuit 76 to input position 5'. Likewise, the data from the B Register B4 40 would be transmitted through gate circuit 70 via OR circuit 74 to input position 5. The output at output position 05 would be gated via gate circuit 82 to OR circuit 84. The output of OR circuit 84 would be combined with the data in the C Register position C4 58 in EXCLUSIVE OR element 86 to determine whether the contents of the C Register position 4 was the same as the data developed by the ALU using a different data path.

As can be seen from the above identified preferred embodiments of the present invention, the technique of pseudoduplication for use in addition operations would require the expansion of the normal data path for the ALU by at least one bit position so as to be able to accommodate the shifting of the data to different data input positions for generating the data for comparison with the data developed in the first phase of the operation. For logical operations such as AND, OR and EXCLUSIVE OR, the data paths need not be expanded but merely requires the changing of the respective input bit positions. After the completion of both the first phase and second phase calculations, the output gating circuitry need only shift the second phase output data into alignment with the data generated during the first phase so as to be able to correctly determine whether an error has occurred.

While the invention has been particularly shown and described with reference to preferred embodiments, it will be understood by those of skill in the art that the foregoing and other changes and omissions in the form and detail thereof may be made without departing from the spirit and scope of the invention which is to be limited only as set forth in the following claims.

What is claimed is:

1. An apparatus for detecting errors comprising the combination of:

a first and second data register for storing representations of binary data;

an arithmetic-logical unit capable of performing the functions of addition, subtraction, AND, OR, EXCLUSIVE OR, and shift, said arithmetic-logical unit having at least as many data paths as there are data bits in said first and second data registers, each data path having an output, said arithmetic-logical unit having paired inputs for each data bit position in said first and second data register;

a first gating means active in a first mode to gate the data bits in said first and second data registers to said paired inputs of said arithmetic-logical unit and active during a second mode to gate the data from said first and second data registers to a different set of paired inputs than the set of paired inputs employed during said first mode;

a third data register;

a second gating means active in said first mode to gate data from the outputs of said arithmetic-logical unit to said third data register and active during said second mode to produce a gating output, said gating output being equal to the output of said arithmetic-logical unit during said second mode; and a comparison means for comparing the contents of said third data register and said gating output, said comparison means producing an error signal when any data bit in said third data register is different from the properly aligned gating output.

2. An apparatus as in claim 1 wherein said second gating means includes:

means for shifting the data received from the arithmetic-logical unit during said second mode into alignment with the data in said third register.

3. A method of detecting errors in computer calculations comprising the steps of:

performing a first calculation to produce a first result using a first set of data paths in the calculational circuitry;

storing said first result;

performing a second calculation identical to said first calculation to produce a second result, said second calculation using a second set of data paths different from said first set of data paths, at least one of said second set of data paths being the same as used during said first calculation for a different pair of data bits; and comparing said second result with said first result to determine whether said first result is identical to said second result.

4. The method of detecting errors of claim 3 additionally comprising the step of:

producing an error signal when the comparison of said second result with said first result indicates a difference between the results.

5. An apparatus for detecting computational errors in a computational unit comprising:

a first and second data register each for storing binary data and having a plurality of bit positions in each of said first and second data registers;

an arithmetic-logical unit having a plurality of data paths therethrough, each data path having an output, a first and second entry point and each said data path being capable of performing addition, subtraction, OR, AND, EXCLUSIVE OR, and shift operations upon the data entering said first and second entry points, said arithmetic-logical unit having more than as many data paths as there are binary bit positions in either of said first or second data registers;

a plurality of first gating means, each of said first gating means active during said first phase of operation to gate binary data from said first data register to at least some of said first input points;

a plurality of second gating means, each of said second gating means active during said first phase of operation to gate binary data from said second data register to at least some of said second input points, said activated second input points being in the same data paths as the first input points activated by said plurality of first gating means;

a third data register for storing binary data;

a plurality of third gating means for gating the output of said arithmetic-logical unit to said third data register during said first phase of operation;

a plurality of fourth gating means, each of said fourth gating means active during a second phase of operation to gate the binary data from said first data register to at least some of said first input points, each activated input point during said second phase of operation being a different first input point than was activated by said first gating means during said first phase of operation for each binary bit position in said first data register;

a plurality of fifth gating means, each of said fifth gating means active during a second phase of operation to gate the binary data from said second data register to at least some of said second input points, said activated second input points being in the same data paths as the first input points activated by said plurality of fourth gating means; and a comparison means for comparing the contents of said third data register and the output of said arithmetic-logical unit during said second phase of operation, said comparison means producing an error signal when any data bit in said third data register is different from the properly associated output bit generated by said arithmetic-logical unit during said second phase of operation.

6. An apparatus for detecting computational errors in a computational unit comprising:

a first and second data register each for storing binary data and having a plurality of bit positions in each of said first and second data register;

an arithmetic-logical unit having a plurality of data paths therethrough, each data path having an output, the first and second entry point and each said data path being capable of performing OR, AND, and EXCLUSIVE OR operations upon the data entering said first and second entry points, said arithmetic-logical unit having at least as many data paths as there are binary bit positions in either of said first or second data registers;

a plurality of first gating means, each of said first gating means active during a first phase of operation to gate binary data from said first data register to at least some of said first input points;

a plurality of second gating means, each of said second gating means active during said first phase of operation to gate binary data from said second data register to at least some of said second input points, said activated second input points being in the same data paths as the first input points activated by said plurality of first gating means;

a third data register for storing binary data;

a plurality of third gating means for gating the output of said arithmetic-logical unit to said third data register during said first phase of operation;

a plurality of fourth gating means, each of said fourth gating means active during a second phase of operation to gate the binary data from said first data register to at least some of said first input points, each activated input point during said second phase of operation being a different first input point than was activated by said first gating means during said first phase of operation for each binary bit position in said first data register;

a plurality of fifth gating means, each of said fifth gating means active during a second phase of operation to gate the binary data from said second data register to at least some of said second input points, said activated second input points being in the same data paths as the first input points activated by said plurality of fourth gating means; and a comparison means for comparing the contents of said third data register and the output of said arithmetic-logical unit during said second phase of operation, said comparison means producing an error signal when any data bit in said third register is different from the properly associated output bit generated by said arithmetic-logical unit during said second phase of operation.

* * * * *